(12) United States Patent
Xiong

(10) Patent No.: US 8,395,520 B2
(45) Date of Patent: *Mar. 12, 2013

(54) DEVICE FOR MONITORING VOLTAGE OF MOTHERBOARD

(75) Inventor: Jin-Liang Xiong, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 671 days.

This patent is subject to a terminal disclaimer.

(21) Appl. No.: 12/630,856

(22) Filed: Dec. 4, 2009

(65) Prior Publication Data

US 2011/0032112 A1  Feb. 10, 2011

(30) Foreign Application Priority Data

Aug. 7, 2009  (CN) .......................... 2009 1 0305356

(51) Int. Cl.
*G08B 21/00* (2006.01)

(52) U.S. Cl. ........................................ 340/661; 340/660
(58) Field of Classification Search .................. None
See application file for complete search history.

(56) References Cited

U.S. PATENT DOCUMENTS

| | | | |
|---|---|---|---|
| 7,791,494 B2* | 9/2010 | Chen et al. ...................... 340/661 |
| 7,928,776 B2* | 4/2011 | Wang et al. .................... 327/143 |
| 8,089,264 B2* | 1/2012 | Huang ......................... 324/76.11 |
| 2008/0258927 A1* | 10/2008 | Chen et al. ..................... 340/661 |
| 2009/0313494 A1* | 12/2009 | Wang et al. .................... 713/340 |
| 2010/0146252 A1* | 6/2010 | Chang et al. ....................... 713/1 |
| 2011/0029789 A1* | 2/2011 | Tsai et al. ...................... 713/300 |
| 2011/0050203 A1* | 3/2011 | Huang ......................... 324/76.11 |
| 2012/0043993 A1* | 2/2012 | Xi ................................... 327/80 |

* cited by examiner

*Primary Examiner* — Travis Hunnings
(74) *Attorney, Agent, or Firm* — Altis Law Group, Inc.

(57) ABSTRACT

A device for monitoring a voltage of a motherboard includes a first monitoring circuit, a second monitoring circuit, and an indicating circuit. The first and monitoring circuits are connected to output a control voltage. A value of the control voltage is determined according to a value of the voltage of the motherboard. The control voltage is reduced to control the indicating circuit. The indicating circuit indicates whether the voltage of the motherboard is normal.

18 Claims, 1 Drawing Sheet

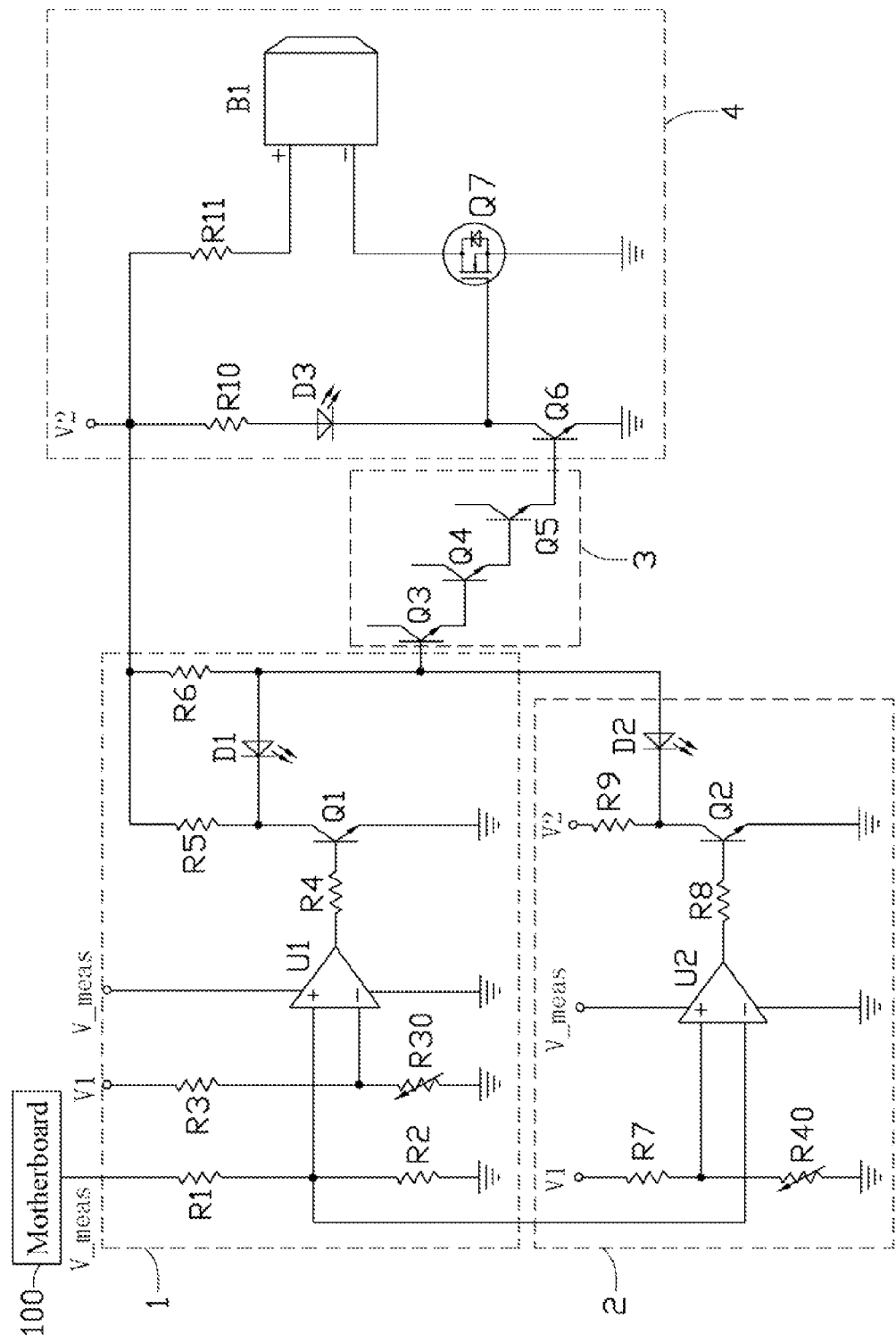

DEVICE FOR MONITORING VOLTAGE OF MOTHERBOARD

BACKGROUND

1. Technical Field

The present disclosure relates to monitoring devices, and particularly to a monitoring device for monitoring voltages of a computer motherboard.

2. Description of Related Art

In a computer system, a power supply provides power to the motherboard. The motherboard then provides the power at certain voltages such as +5 volts (V), −5V, +3.3V, +12V, −12V, and so on, to chipsets or circuits on the motherboard. However, if any of the voltages provided by the motherboard becomes too high, the chipsets or circuits may be damaged, or if the voltage provided by the motherboard is too low, the chipsets or circuits may be unable to operate properly.

BRIEF DESCRIPTION OF THE DRAWING

The drawing is a circuit diagram of an embodiment of a device for monitoring a voltage of a computer motherboard.

DETAILED DESCRIPTION

Referring to the drawing, an embodiment of a device is used to monitor a voltage V_meas of a motherboard 100. The device includes two monitoring circuits 1 and 2, a voltage reduction circuit 3, and an indicating circuit 4.

The monitoring circuit 1 includes resistors R1-R6, a comparator U1, a variable resistor R30, an electric switch Q1, and a light-emitting diode (LED) D1. A first end of the resistor R1 receives the voltage V_meas. A second end of the resistor R1 is connected to a first end of the resistor R2. A second end of the resistor R2 is grounded. A first end of the resistor R3 receives an external voltage V1. A second end of the resistor R3 is connected to a first end of the variable resistor R30. A second end of the variable resistor R30 is grounded. In this embodiment, the external voltage V1 is provided by a power supply, such as an advanced technology expanding (ATX) power supply of the motherboard. The comparator U1 includes a power terminal, a ground terminal, a non-inverting input terminal, an inverting input terminal, and an output terminal. The power terminal of the comparator U1 receives the voltage V_meas. The non-inverting input terminal of the comparator U1 is connected to a node between the resistors R1 and R2. The inverting input terminal of the comparator U1 is connected to a node between the resistor R3 and the variable resistor R30. A first terminal of the electric switch Q1 is connected to the output terminal of the comparator U1 via the resistor R4. A second terminal of the electric switch Q1 is grounded. A third terminal of the electric switch Q1 receives a working voltage V2 via the resistor R5. A cathode of the LED D1 is connected to the third terminal of the electric switch Q1. An anode of the LED D1 receives the working voltage V2 via the resistor R6. The anode of the LED D1 functions as an output of the monitoring circuit 1.

The monitoring circuit 2 includes resistors R7-R9, a comparator U2, a variable resistor R40, an electric switch Q2, and an LED D2. A first end of the resistor R7 receives the external voltage V1. A second end of the resistor R7 is connected to a first end of the variable resistor R40. A second end of the variable resistor R40 is grounded. The comparator U2 includes a power terminal, a ground terminal, a non-inverting input terminal, an inverting input terminal, and an output terminal. The power terminal of the comparator U2 receives the voltage V_meas. The inverting input terminal of the comparator U2 is connected to a node between the resistors R1 and R2. The non-inverting input terminal of the comparator U2 is connected to a node between the resistor R7 and the variable resistor R40. A first terminal of the electric switch Q2 is connected to the output terminal of the comparator U2 via the resistor R8. A second terminal of the electric switch Q2 is grounded. A third terminal of the electric switch Q2 receives the working voltage V2 via the resistor R9. A cathode of the LED D2 is connected to the third terminal of the electric switch Q2. An anode of the LED D2 is connected to the anode of the LED D1. The anode of the LED D2 functions as an output of the monitoring circuit 2.

The voltage reduction circuit 3 includes three electric switches Q3, Q4, and Q5. A first terminal of the electric switch Q3 is connected to the anodes of the LEDs D1 and D2, and functions as an input of the voltage reduction circuit 3. A second terminal of the electric switch Q3 is connected to a first terminal of the electric switch Q4. A first terminal of the electric switch Q5 is connected to a second terminal of the electric switch Q4. A third terminal of each of the switches Q3, Q4, and Q5 is not connected. The second terminal of the electric switch Q5 functions as an output of the voltage reduction circuit 3.

The indicating circuit 4 includes an LED D3, a buzzer B1, two electric switches Q6 and Q7, and two resistors R10 and R11. A first terminal of the electric switch Q6 is connected to the second terminal of the electric switch Q5. A second terminal of the electric switch Q6 is grounded. A third terminal of the electric switch Q6 is connected to a cathode of the LED D3. An anode of the LED D3 receives the working voltage V2 via the resistor R10. A first terminal of the electric switch Q7 is connected to the third terminal of the electric switch Q6. A second terminal of the electric switch Q7 is grounded. A third terminal of the electric switch Q7 is connected to a cathode of the buzzer B1. An anode of the buzzer B1 receives the working voltage V2 via the resistor R11.

The non-inverting input terminal of the comparator U1 and the inverting terminal of the comparator U2 receive a voltage at the node between the resistors R1 and R2. A first reference voltage at the inverting terminal of the comparator U1 is obtained by adjusting the variable resistor R30. The first reference voltage is calculated by dividing the external voltage V1 by the resistor R3 and the variable resistor R30. The first reference voltage is designated as an upper limit of a variation of the voltage at the node between the resistors R1 and R2. A second reference voltage at the non-inverting terminal of the comparator U2 is obtained by adjusting the variable resistor R40. The second reference voltage is calculated by dividing the external voltage V1 by the resistor R7 and the variable resistor R40. The second reference voltage is designated as a lower limit of the variation of the voltage at the node between the resistors R1 and R2.

When the voltage at the node between the resistors R1 and R2 is higher than the first reference voltage, the comparator U1 outputs a transistor-transistor logic (TTL) high level voltage signal. The electric switch Q1 is turned on. The LED D1 is turned on to emit light, indicating that the voltage V_meas is higher than an upper limit of variation of the voltage V_meas. When the voltage at the node between the resistors R1 and R2 is lower than the second reference voltage, the comparator U2 outputs a TTL high level voltage signal. The electric switch Q2 is turned on. The LED D2 is turned on to emit light, indicating that the voltage V_meas is lower than a lower limit of variation of the voltage V_meas.

It is determined from characteristics of an LED that when the LED is on, a constant voltage difference between two ends of the LED exists. In this embodiment, the constant voltage difference of each of the LEDs D1 and D2 is 2 volts (V). Therefore, when the voltage at the node between the resistors R1 and R2 is higher than the first reference voltage or lower than the second reference voltage, a voltage at the node between the anodes of the LEDs D1 and D2 is about 2V. The voltage at the node between the anodes of the LEDs D1 and D2 is reduced by the electric switches Q3, Q4, and Q5. The voltage reduction circuit 3 then outputs a voltage that is low enough to turn off the electric switch Q6. The electric switch Q7 is turned on. The LED D3 is turned off. The buzzer B1 generates sound to indicate that the voltage V_meas is abnormal.

When the voltage at the node between the resistors R1 and R2 is lower than the first reference voltage and higher than the second reference voltage, both of the comparators U1 and U2 output TTL low level voltage signals. The electric switches Q1 and Q2 are turned off. The LEDs D1 and D2 will not emit light. The working voltage V2 is reduced by the voltage reduction circuit 3. The voltage reduction circuit 3 then output a voltage that is high enough to turn on the electric switch Q6. The electric switch Q7 is turned off. The buzzer B1 will not generate sound. The LED D3 is turned on to emit light.

Therefore, the LED D1 emits light when the voltage V_meas is too high. The LED D2 emits light when the voltage V_meas is too low. The buzzer B1 generates sound when the voltage V_meas is too high or too low. The LED D3 emits light when the voltage V_meas is normal.

In this embodiment, each of the electric switches Q1-Q6 is an npn bipolar junction transistor having a base, an emitter, and a collector functioning as the first, second, and third terminals correspondingly. The electric switch Q7 is an n-type metal oxide semiconductor field effect transistor having a gate, a source, and a drain functioning as the first, second, and third terminals respectively.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A device for monitoring a voltage of a motherboard, the device comprising:
    a first monitoring circuit outputting a first voltage in response to the voltage of the motherboard being higher than an upper limit voltage;
    a second monitoring circuit outputting the first voltage in response to the voltage of the motherboard being lower than a lower limit voltage;
    a voltage reduction circuit reducing the first voltage; and
    an indicating circuit indicating the voltage of the motherboard being abnormal in response to receipt of the reduced first voltage,
    wherein the first monitoring circuit comprises a first voltage divider receiving the voltage of the motherboard, and outputting a divided voltage, the first monitoring circuit further comprises a first comparator, a first electric switch, and a first light emitting diode (LED), the second monitoring circuit comprises a second comparator, a second electric switch, and a second LED; the first comparator compares the divided voltage with a first reference voltage, and outputs a first control signal, the second comparator compares the divided voltage with a second reference voltage, and outputs a second control signal; the first electric switch comprises a first terminal receiving the first control signal, a grounded second terminal, and a third terminal receiving a working voltage via a first resistor, the second electric switch comprises a first terminal receiving the second control signal, a grounded second terminal, and a third terminal receiving the working voltage via a second resistor; a cathode of the first LED is connected to the third terminal of the first electric switch, an anode of the first LED receives the working voltage via a third resistor, a cathode of the second LED is connected to the third terminal of the second electric switch, an anode of the second LED is connected to the anode of the first LED, a node between the anodes of the first and second LEDs outputs the first voltage in response to the divided voltage being higher than the first reference voltage or lower than the second reference voltage, the first LED emits light in response to the divided voltage being higher than first reference voltage, the second LED emits light in response to the divided voltage being lower than the second reference voltage.

2. The device of claim 1, wherein the first voltage divider comprises a fourth resistor and a fifth resistor, a first end of the fourth resistor receives the voltage of the motherboard, a second end of the fourth resistor is connected to a first end of the fifth resistor, a second end of the fifth resistor is grounded.

3. The device of claim 1, wherein the node between the anodes of the first and second LEDs outputs a second voltage in response to the voltage of the motherboard being higher than the lower limit voltage, and lower than the upper limit voltage, the second voltage is obtained by reducing the working voltage by the third resistor, the voltage reduction circuit reduces the second voltage, and outputs a reduced second voltage.

4. The device of claim 3, wherein the indicating circuit comprises a third electric switch, and a third LED, a first terminal of the third electric switch receives the reduced first or second voltage, a second terminal of the third electric switch is grounded, a third terminal of the third electric switch is connected to a cathode of the third LED, an anode of the third LED receives the working voltage via a fourth resistor, the third electric switch is turned off in response to receipt of the reduced first voltage, the third electric switch is turned on in response to receipt of the reduced second voltage, to drive the third LED to emit light.

5. The device of claim 4, wherein the indicating circuit further comprises a fourth electric switch, and a buzzer, a first terminal of the fourth electric switch is connected to the third terminal of the third electric switch, a second terminal of the fourth electric switch is grounded, a third terminal of the fourth electric switch is connected to a cathode of the buzzer, an anode of the buzzer receives the working voltage via a fifth resistor, wherein upon the condition that the fourth electric switch is turned on, the buzzer generates sound in response to the third electric switch being turned off.

6. The device of claim 1, wherein a non-inverting terminal of the first comparator receives the divided voltage, an inverting terminal of the first comparator receives the first reference voltage, an inverting terminal of the second comparator receives the divided voltage, a non-inverting terminal of the second comparator receives the second reference voltage.

7. The device of claim 1, wherein the first and second control signals are transistor-transistor logic (TTL) voltage level signals.

8. The device of claim 1, wherein the first monitoring circuit further comprises a second voltage divider receiving an external voltage, and outputting the first reference voltage by dividing the external voltage, the second monitoring circuit further comprises a third voltage divider receiving the external voltage, and outputting the second reference voltage by dividing the external voltage.

9. The device of claim of claim 8, wherein each of the second and third voltage dividers comprises a resistor and a variable resistor, a first end of the resistor of each of the second and third voltage dividers receives the external voltage, a second end of the of the resistor of each of second and third voltage dividers is connected to a first end of the corresponding variable resistor, a second end of the variable resistor of each of the second and third voltage dividers is ground.

10. The device of claim 1, wherein the voltage reduction circuit comprises a first electric switch, a second electric switch, and a third electric switch, a first terminal of the first electric switch receives the first voltage, a second terminal of the first electric switch is connected to a first terminal of the second electric switch, a first terminal of the third electric switch is connected to a second terminal of the second electric switch, a third terminal of each of the first, second, and third electric switches is not connected; a second terminal of the third electric switch outputs the reduced first voltage.

11. A device for monitoring a voltage of a motherboard, the device comprising:
a first monitoring circuit to receive the voltage of the motherboard, and give an alarm in response to the received voltage being higher than a first predetermined voltage;
a second monitoring circuit to receive the voltage of the motherboard, and give an alarm in response to the received voltage being lower than a second predetermined voltage; an output of the second monitoring circuit being connected to an output of the first monitoring circuit, a node between the outputs of the first and second monitoring circuits outputting a first voltage in response to the voltage of the motherboard being lower than the second predetermined voltage or higher than the first predetermined voltage, the node between the outputs of the first and second monitoring circuits outputting a second voltage in response to the voltage of the motherboard being higher than the second predetermined voltage and lower than the first predetermined voltage;
a voltage reduction circuit reducing the first or second voltage outputted from the node; and
an indicating circuit indicating the voltage of the motherboard being abnormal in response to receipt of the reduced first voltage, and indicating the voltage of the motherboard being normal in response to receipt of the reduced second voltage,
wherein the first monitoring circuit comprises a first voltage divider receiving the voltage of the motherboard, and outputting a divided voltage, the first monitoring circuit further comprises a first comparator, a first electric switch, and a first light emitting diode (LED), the second monitoring circuit comprises a second comparator, a second electric switch, and a second LED; the first comparator compares the divided voltage with a first reference voltage, and outputs a first control signal, the second comparator compares the divided voltage with a second reference voltage, and outputs a second control signal; the first electric switch comprises a first terminal receiving the first control signal, grounded second terminal, and a third terminal receiving a working voltage via a first resistor, the second electric switch comprises a first terminal receiving the second control signal, a grounded second terminal, and a third terminal receiving the working voltage via a second resistor; a cathode of the first LED is connected to the third terminal of the first electric switch, an anode of the first LED receives the working voltage via a third resistor, a cathode the second LED is connected to the third terminal of the second electric switch, an anode of the second LED is connected to the anode of the first LED, a node between the anodes of the first and second LEDs outputs the first voltage in response to the divided voltage being higher than the first reference voltage or lower than the second reference voltage, the first LED emits light in response to the divided voltage being higher than first reference voltage, the second LED emits light in response to the divided voltage being lower than the second reference voltage.

12. The device of claim 11, wherein the first and second predetermined voltages are respectively upper and lower limits of a variation of the voltage of the motherboard.

13. The device of claim 11, wherein the indicating circuit comprises a third electric switch, and a third LED, a first terminal of the third electric switch receives the reduced first or second voltage, a second terminal of the third electric switch is grounded, a third terminal of the third electric switch is connected to a cathode of the third LED, an anode of the third LED receives the working voltage via as fourth resistor, the third electric switch is turned off in response to receipt of the reduced first voltage, the third electric switch is turned on in response to receipt of the reduced second voltage, to drive the third LED to emit light.

14. The device of claim 13, wherein the indicating circuit further comprises a fourth electric switch, and a buzzer, a first terminal of the fourth electric switch is connected to the third terminal of the third electric switch, a second terminal of the fourth electric switch is grounded, a third terminal of the fourth electric switch is connected to a cathode of the buzzer, an anode of the buzzer receives the working voltage via a fifth resistor, wherein upon the condition that the fourth electric switch is turned on, the buzzer generates sound in response to the third electric switch being turned off 15. The device of claim 11, wherein a non-inverting terminal of the first comparator receives the divided voltage, an inverting terminal of the first comparator receives the first reference voltage, an inverting terminal of the second comparator receives the divided voltage, a non-inverting terminal of the second comparator receives the second reference voltage.

16. The device of claim 11, wherein the first monitoring circuit further comprises a second voltage divider receiving an external voltage, and outputting the first reference voltage by dividing the external voltage, the second monitoring circuit further comprises a third voltage divider receiving the external voltage, and outputting the second reference voltage by dividing the external voltage.

17. The device of claim 16, wherein each of the second and third voltage dividers comprises a resistor and a variable resistor, a first end of the resistor of each of the second and third voltage dividers receives the external voltage, a second end of the of the resistor of each of the second and third voltage dividers is connected to a first end of the corresponding variable resistor, a second end of the variable resistor of each of the second and third voltage dividers is ground.

18. The device of claim 11, wherein the voltage reduction circuit comprises a first electric switch, a second electric switch, and a third electric switch, a first terminal of the first electric switch receives the first voltage, a second terminal of the first electric switch is connected to a first terminal of the second electric switch, a first terminal of the third electric switch is connected to a second terminal of the second electric switch, a third terminal of each of the first, second, and third electric switches is not connected; a second terminal of the third electric switch outputs the reduced first voltage.

\* \* \* \* \*